US012630076B2

(12) United States Patent
Huester et al.

(10) Patent No.: US 12,630,076 B2
(45) Date of Patent: May 19, 2026

(54) METHOD FOR OPERATING A LIGHT-BASED DRIVER ASSISTANCE SYSTEM OF A MOTOR VEHICLE

(71) Applicant: HELLA GmbH & Co. KGaA, Lippstadt (DE)

(72) Inventors: Christian Huester, Salzkotten (DE); Boris Kubitza, Moehnesee-Koerbecke (DE); Jeremias Spiegel, Lippstadt (DE); Carsten Wilks, Lippstadt (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 134 days.

(21) Appl. No.: 18/382,715

(22) Filed: Oct. 23, 2023

(65) Prior Publication Data

US 2024/0131981 A1 Apr. 25, 2024
US 2024/0227665 A9 Jul. 11, 2024

(30) Foreign Application Priority Data

Oct. 21, 2022 (DE) .......................... 102022127863.8

(51) Int. Cl.
| | |
|---|---|
| *B60Q 1/12* | (2006.01) |
| *B60Q 1/08* | (2006.01) |
| *B60Q 1/50* | (2006.01) |

(52) U.S. Cl.
CPC ................ *B60Q 1/12* (2013.01); *B60Q 1/50* (2013.01); *B60Q 2300/122* (2013.01); *B60Q 2300/322* (2013.01); *B60Q 2400/50* (2013.01)

(58) Field of Classification Search
CPC ...... B60Q 9/008; B60Q 1/08; B60Q 2300/42; B60Q 1/525; B60Q 1/085;
(Continued)

(56) References Cited

U.S. PATENT DOCUMENTS

| | | | | |
|---|---|---|---|---|
| 7,287,884 B2 * | 10/2007 | Koike | ................... | B60Q 1/484 |
| | | | | 348/148 |
| 8,260,536 B2 * | 9/2012 | Stefani | .................... | B60Q 1/50 |
| | | | | 701/418 |

(Continued)

FOREIGN PATENT DOCUMENTS

| | | |
|---|---|---|
| DE | 102013021587 A1 | 8/2014 |
| DE | 102014000935 A1 | 7/2015 |

(Continued)

OTHER PUBLICATIONS

Budanow, Marina; "Entwicklung eines lichtbasierten Fahrerassistenzsystems" vol. 24; Spektrum der Lichttechnik, Karlsruhe; Karlsruher Insitut fuer Technologie, 2020.

*Primary Examiner* — Wei (Victor) Y Chan
(74) *Attorney, Agent, or Firm* — Muncy, Geissler, Olds & Lowe, P.C.

(57) ABSTRACT

A method for operating a light-based driver assistance system of a motor vehicle, wherein via at least one headlight of the motor vehicle, a light distribution is projected onto the roadway in front of the motor vehicle. The light distribution produces a lane marking, the width of which is essentially equal to the vehicle width of the motor vehicle and the course of which corresponds to a predicted lane course when the motor vehicle is driving. The method steps are carried out continuously when driving through a curve: predicting the lane course when driving through the curve, determining the point of intersection of the inner lane boundary with the light field limitation of a light field projectable onto the roadway when driving through the curve, setting a distal boundary of the lane marking, and projecting a light distribution onto the roadway in front of the motor vehicle.

8 Claims, 1 Drawing Sheet

(58) Field of Classification Search
CPC ................ B60Q 2300/322; B60Q 1/12; B60Q
2300/122; B60Q 1/18; B60Q 2300/112;
B60Q 2400/50
See application file for complete search history.

(56) References Cited

U.S. PATENT DOCUMENTS

| | | | | |
|---|---|---|---|---|
| 11,156,334 B2* | 10/2021 | Morel | ...................... | B60Q 1/14 |
| 11,249,341 B2* | 2/2022 | Kunii | ...................... | B60Q 1/50 |
| 11,338,729 B2* | 5/2022 | Verbeke | ................ | B60Q 1/547 |
| 11,999,295 B2* | 6/2024 | Tatara | ................... | B60Q 1/507 |
| 2002/0036901 A1* | 3/2002 | Horii | ....................... | B60Q 1/18 |
| | | | | 362/466 |
| 2003/0147247 A1* | 8/2003 | Koike | ................... | B60Q 1/484 |
| | | | | 362/464 |
| 2016/0207443 A1* | 7/2016 | Widdowson | ......... | B60Q 1/0011 |
| 2016/0331989 A1* | 11/2016 | Cho | ..................... | A61N 1/0464 |
| 2021/0197708 A1* | 7/2021 | Sung | ................... | G06V 20/588 |
| 2022/0178509 A1* | 6/2022 | Okubo | ..................... | B60Q 1/12 |

FOREIGN PATENT DOCUMENTS

| | | | |
|---|---|---|---|
| DE | 102016006919 A1 | 2/2017 | |
| DE | 102015012022 A1 | 3/2017 | |
| EP | 1334869 A2 | 8/2003 | |

* cited by examiner

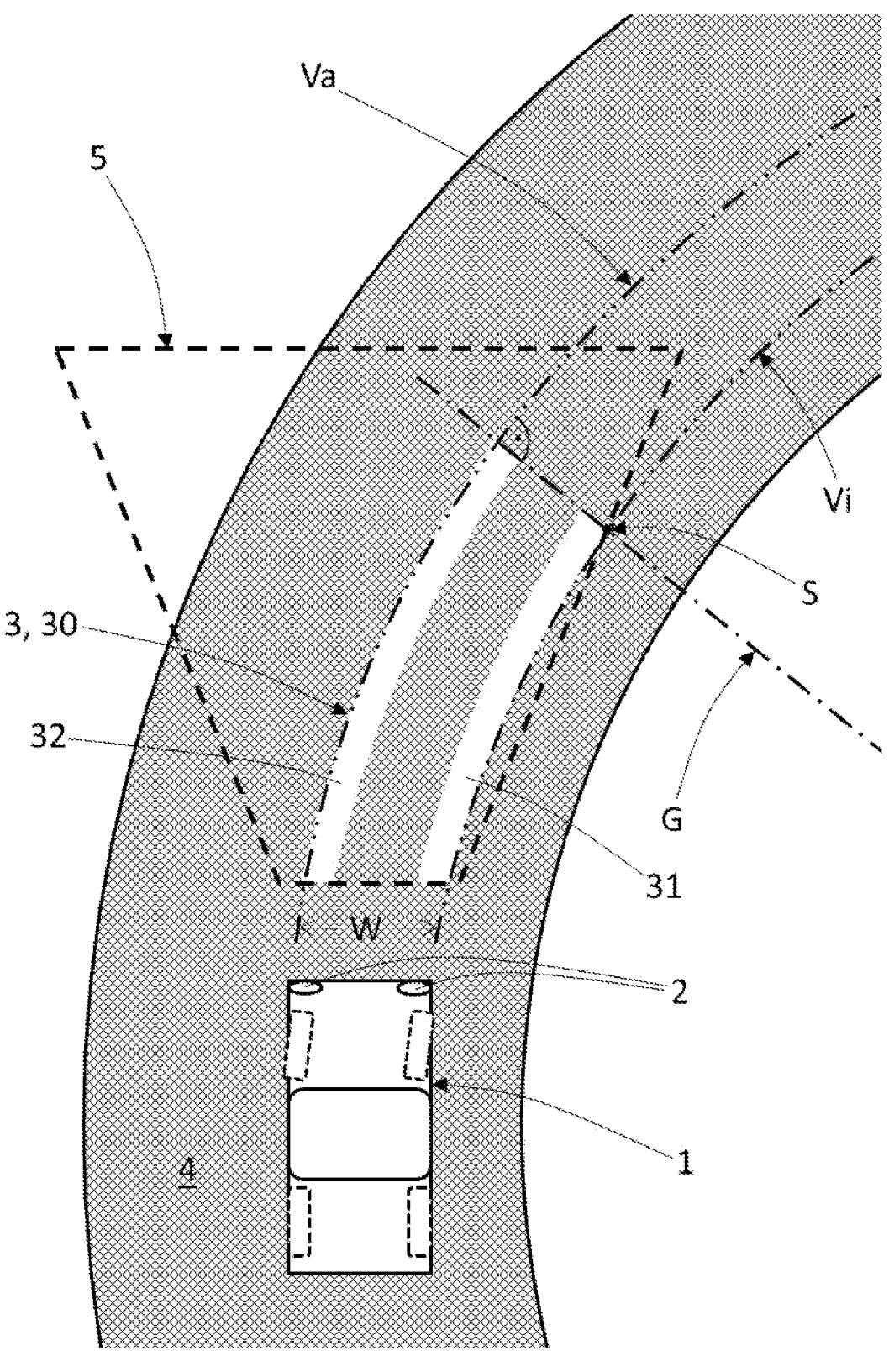

METHOD FOR OPERATING A LIGHT-BASED DRIVER ASSISTANCE SYSTEM OF A MOTOR VEHICLE

This nonprovisional application claims priority under 35 U.S.C. § 119(a) to German Patent Application No. 102022127863.8, which was filed in Germany on Oct. 21, 2022, and which is herein incorporated by reference.

BACKGROUND OF THE INVENTION

Field of the Invention

The present invention relates to a method for operating a light-based driver assistance system of a motor vehicle, wherein via at least one headlight of the motor vehicle, a light distribution for the generation of a lane marking is projected onto the roadway in front of the motor vehicle.

Description of the Background Art

Light-based driver assistance systems are used to assist the driver of a motor vehicle in coping with different traffic situations by means of symbols, signals or markings projected onto the roadway. For example, M. Budanov: *Development of a light-based driver assistance system*, KIT Scientific Publishing (2020), discloses studies into the effectiveness of light-based driver assistance systems with regard to driving safety and driving comfort.

The lane markings addressed by the present invention are produced by a light distribution usually emitted by one or both headlights of the motor vehicle. In this case, a marking corresponding to the width of the vehicle is projected onto a section of roadway in front of the motor vehicle, so that the driver receives a visualization of the required space, for example when entering the lane narrowing of a highway construction site. In the prior art, for example, lane markings are known as two single-lane markings spaced apart from each other, which run parallel to each other in front of the vehicle as linear light strips, thus marking the predicted course of the motor vehicle. For example, the single-lane markings each have a width of the order of 10 centimeters and extend over a length of several tens of meters onto the roadway ahead. In particular, high-resolution headlights are suitable for generating light distributions with such lane markings, wherein such high-resolution headlights are based, for example, on technologies such as Solid State Lightning (SSL), Liquid Crystal Displays (LCD), Digital Light Processing (DLP) and Laser Scanning.

When driving through curves, the lane marking depicts the predicted course of the vehicle. In the case of small curve radii, for example when driving through a traffic circle, the length of the lane marking that can be displayed is limited by the dimensions of the light field that can be projected onto the roadway by the headlights. High-resolution headlights have comparatively small opening angles of approx. 20°, and the inner boundary of the lane marking is limited by the inner light field limitation. Artifact formation, such as distortion of the lane marking, can occur at the edge of the light field, and the distal boundary of the lane marking does not have a well-defined course. This can be disruptive for the driver of the motor vehicle and thus counteract the actual purpose of the lane marking.

SUMMARY OF THE INVENTION

It is therefore an object of the present invention to provide a method for operating a light-based driver assistance system which enables a suitable representation of a lane marking when driving through curves.

In an exemplary embodiment, a method is provided for operating a light-based driver assistance system of a motor vehicle, wherein a light distribution is projected onto the roadway in front of the motor vehicle by means of at least one headlight of the motor vehicle, wherein the light distribution produces a lane marking, the width of which is substantially equal to the lane width of the motor vehicle and the course of which corresponds to a predicted lane when the motor vehicle is driving, and wherein, when driving through a curve, the following method steps may be carried out continuously: predicting the lane course of the motor vehicle when driving through the curve; determining the point of intersection of the inner lane boundary of the predicted lane with the inner light field limitation of a light field projected onto the roadway by means of the headlight when driving through the curve; setting a distal boundary of the lane marking as a section of a straight line that passes through the specific point of intersection and center of the curve; and projecting a light distribution onto the roadway in front of the motor vehicle by creating a lane marking with the specified distal boundary.

The invention is based on the idea of making maximum spatial use of the light field of the headlight to generate the lane marking and at the same time ensuring a well-defined and distortion-free distal limitation of the lane marking. As a result, regardless of the radius of the curve traveled, a suitable lane marking is created that has a harmonious effect for the driver of the motor vehicle.

The method steps according to the invention can be continuously repeated when driving through a curve and thus also take into account a changing curve radius. In particular, the prediction of the lane course is carried out on the basis of the steering wheel angle of the motor vehicle, for example by means of access to an assignment of steering wheel angles to associated curve radii stored in a control unit. The point of intersection of the inner lane boundary of the predicted lane course with the light field limitation on the inside of the curve limits the representable length of the lane marking, i.e., the tighter the curve traveled, the shorter the lane marking becomes. Starting from the defined point of intersection, the distal boundary of the lane marking is defined as a section of a straight line passing through the point of intersection and the center of the curve, i.e., that the distal boundary is perpendicular to a tangent to the inner lane boundary at the point of intersection.

The prediction of the lane course, the determination of the point of intersection and the determination of the distal boundary are carried out repeatedly, for example, by means of a control unit of the motor vehicle.

For example, the lane marking has two parallel and spaced single-lane markers. The distal boundary of the lane marking is formed by the distal boundaries of the single-lane markings, which lie on the straight line running through the defined point of intersection and the center of the curve. Alternatively, the lane marking can be represented, for example, by a plurality of parallel lines of different widths, by symbols lined up in a row, or by a full-surface marking of the predicted lane course.

Furthermore, the lane marking can be generated directly by the light distribution projected onto the roadway, i.e., the lane marking is formed by illuminated sections of the roadway. This embodiment is particularly suitable for daytime driving. Alternatively, the lane marking can be generated by non-illuminated sections within the light distribution projected onto the roadway, i.e., that the lane markings are visually distinguished from the otherwise illuminated road-way as non-illuminated sections. This is particularly useful when driving at night, where the roadway in front of the vehicle is already illuminated by the low beam.

Further scope of applicability of the present invention will become apparent from the detailed description given here-inafter. However, it should be understood that the detailed description and specific examples, while indicating pre-ferred embodiments of the invention, are given by way of illustration only, since various changes, combinations, and modifications within the spirit and scope of the invention will become apparent to those skilled in the art from this detailed description.

BRIEF DESCRIPTION OF THE DRAWING

The present invention will become more fully understood from the detailed description given hereinbelow and the accompanying drawing which are given by way of illustra-tion only, and thus, are not limitive of the present invention, and wherein the sole FIGURE illustrates a vehicle on a roadway.

DETAILED DESCRIPTION

To illustrate the method according to the invention, the FIGURE shows a motor vehicle 1 on a roadway 4, the course of which forms a curve. By means of the headlights 2, the light distribution 3 is projected onto the carriageway 4 in front of the motor vehicle 1, wherein the light distribution 3 generates the lane marking 3, which has the two parallel and spaced single-lane markings 31, 32 in the form of light strips on the roadway 4. For example, the proximal boundary of the lane marking 30 is five meters in front of the motor vehicle 1 and the position of the distal boundary is deter-mined by the method according to the invention and con-tinuously adapted to the radius of the curve traveled.

The predicted lane course of the motor vehicle 1 when driving through the curve is shown on the basis of the course of the inner lane boundary Vi and the outer lane boundary Va, which also correspond to the outer boundaries of the lane marking 30 and the distance between which essentially corresponds to the vehicle width W of the motor vehicle 1. The course of the lane, i.e., the course of the inner lane boundary Vi and the outer lane boundary Va is predicted in particular on the basis of the steering wheel angle of the motor vehicle 1, wherein the prognosis and thus also the lane marking 30 is continuously updated when driving through the curve and adapted to the detailed course of the curve.

The light distribution 3 that can be projected onto the roadway 4 by means of the headlights 2 is limited by the dimensions of the light field 5, which forms the angular range in front of the motor vehicle 1 that can in principle be illuminated with the headlights 2 used for this purpose. The point of intersection S of the inner lane boundary Vi with the inside light field limitation is determined within the frame-work of the method according to the invention. Starting from the point of intersection S, the distal boundary of the lane marking 30, i.e., the distal boundaries of the single-lane markings 31, 32 is determined. According to the invention, the distal boundary of the lane marking 30 runs on the straight line G, wherein the straight line G passes through the point of intersection S and the center of the curve traveled. The distal boundary runs perpendicular to a tangent to the inner lane boundary Vi at the point of intersection S and perpendicular to a tangent to the outer lane boundary Va at the point of intersection with the straight line G. To be specific, the lane marking 30 is "cut off" by the straight line G. Thus, the lane marking 30 creates a "coherent", harmo-nious visual impression for the driver of the motor vehicle 1 and the lane marking 30 completely fulfills the intended purpose of an assistance function that increases driving safety and driving comfort.

The invention is not limited in its embodiment to the preferred embodiment given above. Rather, a number of variants are conceivable, which make use of the presented solution even with fundamentally different embodiments. All features and/or advantages resulting from the claims, the description or the FIGURE can be essential to the invention both individually and in a wide variety of combinations.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method to operate a light-based driver assistance system of a motor vehicle, wherein at least one headlight of the motor vehicle projects a light distribution onto a road-way in front of the motor vehicle, the light distribution produces a lane marking, a width of which is essentially equal to a vehicle width of the motor vehicle and a course of which corresponds to a predicted lane course when the motor vehicle is driving, the method comprising:

predicting a lane course of the motor vehicle when driving through a curve;

determining a point of intersection of an inner lane boundary of the predicted lane course with an inner light field limitation of a light field projectable onto the roadway via the headlight when driving through the curve;

setting a distal boundary of the lane marking, the distal boundary being a section of a straight line, wherein the straight line passes through the point of intersection and a center of the curve; and projecting a light distribution onto the roadway in front of the motor vehicle to create the lane marking that terminates at the distal boundary.

2. The method according to claim 1, wherein the predic-tion of the lane course is carried out based on a steering wheel angle of the motor vehicle.

3. The method according to claim 1, wherein the lane marking has two parallel and spaced single-lane markings.

4. The method according to claim 1, wherein the lane marking is directly generated by the light distribution pro-jected onto the roadway.

5. The method according to claim 1, wherein the lane marking is generated by non-illuminated sections within the light distribution projected onto the roadway.

6. The method according to claim 1, wherein the steps of predicting, determining, setting, and projection are carried out continuously when driving through the curve.

7. The method according to claim 1, wherein the straight line also passes through the inner lane boundary of the predicted lane course and an outer lane boundary of the predicted lane course when the vehicle drives through the curve.

8. The method according to claim 1, wherein the light distribution, that is projected on the roadway in front of the motor vehicle to create the lane marking that terminates at the distal boundary, is located within the light field projected onto the roadway.

\* \* \* \* \*